(No Model.)

H. ROCHER.
DEVICE FOR PRODUCING PHOTOGRAPHIC PLAQUES.

No. 267,720. Patented Nov. 21, 1882.

Witnesses.
G. Huzel
E. G. Westlake

Inventor:
Henry Rocher
By Wm H. Lotz
Attorney

UNITED STATES PATENT OFFICE.

HENRY ROCHER, OF CHICAGO, ILLINOIS.

DEVICE FOR PRODUCING PHOTOGRAPHIC PLAQUES.

SPECIFICATION forming part of Letters Patent No. 267,720, dated November 21, 1882.

Application filed August 14, 1882. (No model.)

*To all whom it may concern:*

Be it known that I, HENRY ROCHER, of Chicago, in the county of Cook and State of Illinois, have invented certain new and useful Improvements in Devices for Producing Photographic Plaques; and I do hereby declare that the following is a full, clear, and exact description thereof, reference being had to the accompanying drawings, and to the letters of reference marked thereon, which form a part of this specification.

This invention has for its object to produce a means by which to press photographic pictures, so as to assume a concave shape and to imitate in appearance the porcelain plaque; and it consists of the novel devices and combinations of devices hereinafter described and specifically claimed.

Figure 1:
Figure 2:
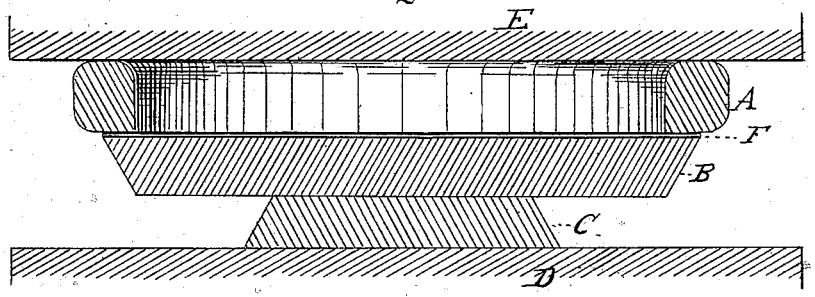
Figure 3:
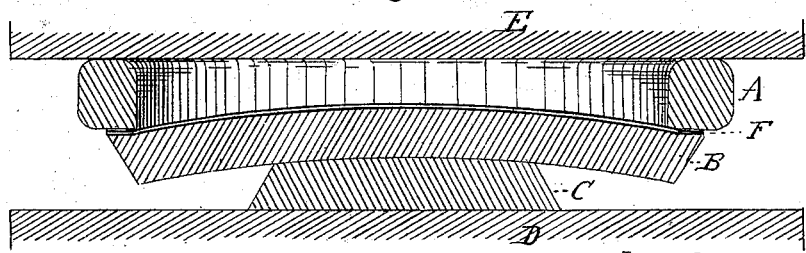

In the accompanying drawings, Figure 1 represents a perspective view of a picture as produced by my device; Fig. 2, a cross-section of the dies as placed together and before being compressed, and Fig. 3 a similar view of the dies after compression.

Corresponding letters in the several figures of the drawings designate like parts.

A denotes a metal frame that is provided with smooth edges and surfaces, and the opening in which is to be of the exact size and shape, corresponding with the outline, the picture is to have—that is, to be pressed—which may be circular, oval, square, or octagon. B is the rubber plate, that is to be of corresponding shape, and has beveled edges, which are to overlap the frame A a sufficient width; and C is a small rubber block or plate, also having chamfered edges.

F is the photographic picture that is to be made concave. This, while yet slightly damp, is placed with its face downward upon the rubber plate B, and the metal frame A is placed on top of it, while the rubber block C is placed centrally under plate B, and thus combined the entire apparatus is brought between the base D and follower E of any common hand-press, when, on being compressed, the rubber plate B will assume a convex shape inside of frame A, and while the edges or margin of the photograph are rigidly held between such frame A and plate B such photograph will be bulged out to assume a corresponding shape, and will be kept perfectly smooth during and after the manipulation. After the photograph has remained in the press long enough to be perfectly dry it is removed and another one is put in in the same manner.

This device, as will be noticed, is very simple and will have the advantage of not only enabling a photographic plaque being produced of any circumferential shape, but it also permits the concavation of a picture to any desired degree by pressing the rubber plate B more or less into the frame A.

I am aware that dies for embossing pictures have been constructed with a non-elastic metal bed-plate having a convex-shaped metallic boss and a rigid concave-shaped die-plate with elastic cushions interposed between such members; but I am not aware of any device where the photograph is compressed within the opening in the forming-frame by means of a rubber plate extending entirely across said opening and a central rubber block, which on the descent of the follower E will be caused to press the rubber plate and the picture thereon within the opening in the forming-plate A to any desired extent or degree, depending upon the amount of pressure exerted by the follower. By my arrangement I am enabled to impart to pictures a concavity more or less pronounced without changing the apparatus, which result could not be attained by the use of metallic die-plates, and to my knowledge has not heretofore been obtainable in so simple and effective a manner as by my present invention.

What I claim is—

The device herein described for producing photographic plaques, and consisting of the metal frame A, rubber plate B, extended across said frame A, and central rubber block, C, when used in combination with any common press, substantially in the manner set forth.

In testimony that I claim the foregoing as my invention I affix my signature in presence of two witnesses.

HENRY ROCHER.

Witnesses:
G. HAZEL,
E. G. WESTLAKE.